Dec. 13, 1960 M. B. NEUWORTH 2,964,460
LIQUID CARBON BLACK FEEDSTOCK
Filed May 13, 1958
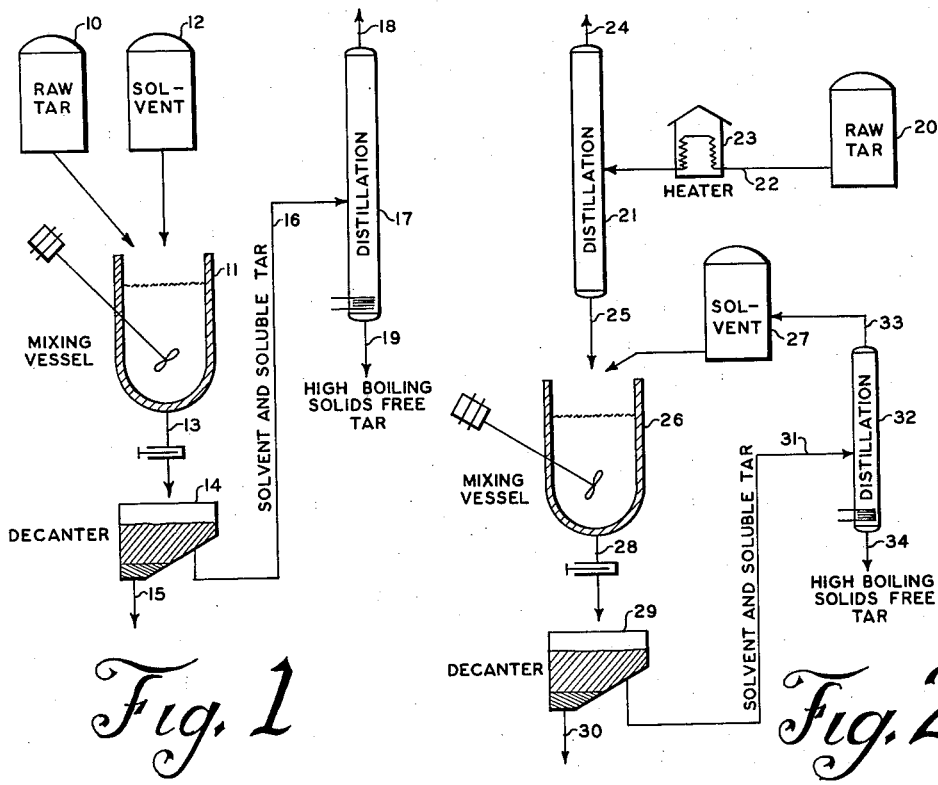
Fig. 1
Fig. 2
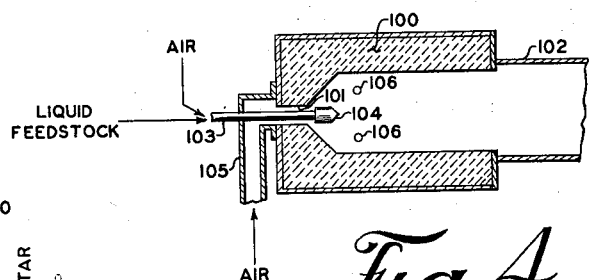
Fig. 4
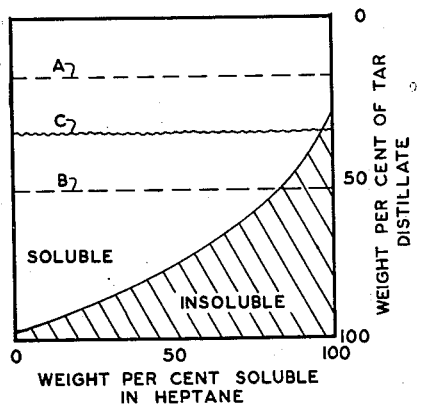
Fig. 3
INVENTOR.
MARTIN B. NEUWORTH
BY
Harry B. Keck
ATTORNEY United States Patent Office 2,964,460
Patented Dec. 13, 1960

2,964,460

LIQUID CARBON BLACK FEEDSTOCK

Martin B. Neuworth, Pittsburgh, Pa., assignor to Consolidation Coal Company, Pittsburgh, Pa., a corporation of Pennsylvania Filed May 13, 1958, Ser. No. 735,053

10 Claims. (Cl. 208—8)

The present invention relates to carbon black feedstocks derived from coal and analogous naturally occurring hydrocarbonaceous solids and to the method for preparing such feedstocks.

BACKGROUND

The term "carbon black" is applied to finely divided particles consisting essentially of carbon which are produced by incomplete combustion of hydrocarbonaceous fuels, both liquid and gaseous. The carbon black industry has seen many varied processes for producing its products. The product carbon black frequently is identified by designating the method of preparation, e.g. channel black, lamp black, furnace black. The present invention is concerned with a feedstock for preparing furnace black which predominates the present day industry.

The carbon black industry has confronted the problem of procuring satisfactory feedstock in sufficient supply. In the early days of the industry, channel black produced from natural gas comprised the bulk of the carbon black market. As the industry developed, new uses for natural gas were uncovered and the price of natural gas gradually increased. At the present time, the majority of the carbon black market is supplied through furnace blacks produced from oil. The oils which are used in the preparation of carbon black must possess special qualities which are frequently difficult to reproduce. At the present time carbon blacks are produced almost exclusively from petroleum derived feedstock.

Some lamp black has been produced in the past from coke oven tar fractions. Creosote oil distillate boiling from about 230 to 400° C. has been employed as a lamp black feedstock in the United States. Anthracene oil boiling from about 230 to 400° C. is employed in Europe as a feedstock for furnace black.

Anthracene oil, obtained as a distillate from coke oven tar, is an excellent liquid carbon black feedstock, according to European reports and tests conducted in the United States. However there is no commercial carbon black production from anthracene oil in the United States because of its higher cost in contrast with petroleum-derived liquids.

There have been several attempts to prepare a liquid carbon black feedstock from low temperature carbonization tar distillates which have been discouraging because the yield of carbon black was low in comparison with the yield from petroleum-derived feedstocks at the same furnace conditions. The quality of carbon black obtained from low temperature carbonization tar distillates has been poor in comparison to that obtained with petroleum-derived feedstocks.

Furnace black production has become a highly developed art. Furnace technology is well understood. A liquid hydrocarbonaceous feedstock is sprayed in an atomized stream into a highly heated chamber where the droplets are vaporized virtually instantaneously and decomposed to carbon particles which are collected as product. Many advances have been made in furnace design and definition of optimum furnace conditions since the introduction of the liquid furnace process in the early 1940's.

LOW TEMPERATURE COAL PYROLYSIS

Pyrolysis of coal at low temperatures is a recognized art which yields products distinct from the product of high temperature pyrolysis. By low temperatures, the range of about 800 to 1400° F. is intended as opposed to temperatures above about 1800° F. comprehended by high temperature pyrolysis. The outstanding example of high temperature pyrolysis is the conventional coke oven. The outstanding example of low temperature pyrolysis is low temperature coal carbonization although low temperature coking of liquid coal products also is comprehended. Such liquid coal products include, for example, low temperature carbonization tar and extracts obtained by treating coal with a suitable solvent. Tar and solvent coal extract may be pyrolyzed at low temperatures by delayed coking, contact coking and fluidized coking, for example. The condensed coker vapors possess properties corresponding to those of low temperature coal carbonization tar. The present invention will be described by specific reference to low temperature coal carbonization.

Low temperature coal carbonization envisages heating coal to a temperature of 800 to 1400° F. whereby devolatilization occurs to yield as product a low volatile solid termed "char," vaporized liquids condensible as tar, and non-condensible gases. Tar yields ranging from about 15 to 50 gallons per ton of coal can be achieved depending upon the starting coal and the specific carbonization conditions. The tar is a heterogeneous mixture of hydrocarbonaceous materials in combination with organic compounds containing oxygen, sulfur and nitrogen. The condensible tar has an initial boiling temperature as low as about 150° C. and includes materials boiling above about 500° C. The tar is predominantly less aromatic in character than the highly aromatic conventional coke oven tar.

Tar from low temperature carbonization comprises vaporized materials which are generated from coal at the relatively low temperatures of 800 to 1400° F. The tar is recovered without exposure to more elevated temperatures which would tend to crack, decompose and reform the material. When tar is produced in a high temperature carbonization process (e.g., above about 1400° F.) such as a conventional coke oven, the similar primary materials are cracked, decomposed and reformed to yield a more highly aromatic tar in significant lower quantity (based on gallons per ton of coal) along with substantially increased quantities of gases and light oils. Thus low temperature carbonization tar has a higher hydrogen-to-carbon ratio, a higher molecular weight and a higher oxygen content than coke oven tar.

A further gross distinction between low temperature tar and conventional coke oven tar exists in the analytically defined properties of "benzene insolubles" and "quinoline insolubles." These materials are those tar ingredients which are not soluble in the stated solvents. With coke oven tar, they comprise finely divided carbonaceous particles which are quite similar to carbon black. These particles are formed during the extremely high temperature treatment which the coke oven tars experience in coke ovens from the instant of generation out of a coal particle until removal from the coke oven. The materials in low temperature tar which are insoluble in benzene and quinoline are not similar to carbon black, but instead, are high molecular weight hydrocarbonaceous materials. There is no exposure of low temperature tar to very high temperature conditions between its instant of generation and its recovery.

Virtually every known materials handling technique has been suggested for use in low temperature carbonization processing systems. The most promising systems have employed some form of agitation, e.g., rotating kilns, moving belts, and the like. The advent of the fluidized solids contacting technique in the past decade developed substantial interest in fluidized low temperature carbonization systems.

All of these agitated systems develop clouds of fine particles of coal and partially devolatilized coal within the carbonization zone. These fine particles are entrained in the evolved carbonization vapors including tar vapors and noncondensible gases. The solid particles are condensed from the vapor stream and appear as contaminants in the raw product tar.

A typical analysis of raw tar from a fluidized low temperature carbonization system is set forth in Table I.

*Table I.—Raw tar composition*

| Component: | Weight percent |
|---|---|
| Solids | 28.4 |
| Moisture | 4.4 |
| Tar— | |
| Boiling below 230° C. | 11.0 |
| 230–300° C. | 4.9 |
| 300–400° C. | 16.1 |
| Boiling above 400° C. | 35.2 |
| Total | 100.0 |

According to the present invention, elimination of the solid particles from the raw tar can be accomplished by the same treatment which results in the preparation of a suitable carbon black feedstock.

The tar fraction boiling below about 230° C. comprises principally volatile tar acids (phenol, cresols, xylenols) and neutral oils along with small quantities of tar bases (nitrogenous compounds) and sulfur compounds. The tar fraction boiling between about 230 and 300° C. comprises higher boiling tar acids (i.e., phenolic compounds) and neutral oils which are useful in creosote. The tar fractions boiling between 300 and 400° C. and boiling above 400° C. represent about half of the raw tar product from low temperature carbonization. These are the fractions toward which the present application is principally directed.

OBJECTS

The principal object of this invention is to provide a carbon black feedstock from low temperature carbonization tar from which carbon black can be produced in high yield.

A further object is to provide a carbon black feedstock from low temperature carbonization tar from which carbon black can be produced in a yield and quality which is comparable to that of acceptable petroleum-derived feedstocks.

Another object of this invention is to provide an outlet for a susbtantial portion of low temperature carbonization tar.

A still further object is to provide a process for preparing carbon black feedstock from the liquid products of pyrolysis of naturally ocurring hydrocarbonaceous solids such as coal.

CARBON BLACK FEEDSTOCK

According to the present invention, the highest boiling fractions of coal pyrolysis products are incorporated into a liquid feedstock suitable for carbon black manufacture. Hitherto carbon black manufacturers have imposed stringent specifications on carbon black feedstock which have been predicated upon the properties of petroleum-derived feedstocks empirically found to be acceptable. Since low temperature carbonization tar products have not conformed to the empirical and artificial specifications, there has been little interest in low temperature carbonization tar products as carbon black feedstocks. One disturbing feature has been the high oxygen content of low temperature tar fractions. Another disturbing feature has been the high "asphaltene" content of low temperature carbonization tar products. I have found that neither of these features is necessarily limiting on the suitability of a low temperature tar product as a carbon black feedstock.

I have found that the lack of success in previous attempts to prepare carbon black from low temperature tar products has resulted not so much from what has been included in the material (e.g., oxygenated materials and asphaltenes) as from what has been removed from the material, specifically the very high boiling constituents of the high boiling fractions. Previous carbon black tests have been made with distillate fractions of the low temperature tar to assure avoidance of nozzle plugging in carbon black furnaces. Distillation of the high boiling fractions of low temperature tar necessarily leaves a residue of highest boiling portions in the distillation equipment. Furthermore, there is some thermal degradation of the very highest boiling constituents which are vaporized during distillation. Thus, when distillation is employed to produce a high boiling fraction of low temperature tar as distillate product, the very best ingredients for carbon black production are either left behind in the still or are destroyed. Hence the carbon black yields (based on gallons of feedstock entering the carbon black furnace) have been low where low temperature tar distillates have been tested.

This has not been the result with tar distillates obtained from coke oven tar. Coke oven tar distillates boiling in the range from about 250 to 400° C. are quite suitable as carbon black feedstock from the standpoint of carbon black yield.

According to the present invention, I produce a selective solvent-soluble solids-free low temperature tar product having an initial boiling temperature in the range of about 300 to 425° C. which contains nearly all of the selective solvent-soluble raw tar constituents boiling above 425° C. in the original tar. The preferred selective solvent comprises a paraffinic hydrocarbon having from 5 to 9 carbon atoms. The highest boiling tar constituents which are eliminated by my process are selectively those which adversely affect carbon black yield. Thermal degradation is avoided in my process. The carbon black yield from the tar product of my invention is comparable to that obtained from petroleum sources.

I accomplish this result by separating entrained solids from the high boiling portions of low temperature tar via a solvent treatment process. The solvent which I employ serves to dissolve a substantial portion of the liquid constituents leaving an insoluble residue which combines with the entrained solids to facilitate their complete removal from the solution of solvent and tar. Elimination of the solvent from the remaining solids-free tar solution leaves behind all of the high boiling tar liquid except for those constituents which are combined with the separated solids. The solids-free high boiling liquid is suitable as a premium carbon black feedstock.

Fortuitously, the portions of high boiling tar rejected by the solvent are selectively those which interfere with carbon black yield and quality. Thus the tar which is soluble in the selective solvent includes the constituents which are beneficial in carbon black production.

The solvent treatment may be carried out with the whole tar product. The soluble tar portions boiling below the desired initial boiling temperature (between 300 and 425° C.) thereafter are flashed and recovered. Preferably, the whole tar is preliminarily flat vaporized to remove all constituents boiling below the desired initial boiling temperature (between 300 and 425° C.). The contaminating solid particles in the whole tar are thereby concentrated in the liquid phase high boiling residue which is subjected to the solvent treatment.

By employing solvent treatment of the high boiling portions of the tar and avoiding distillation, the carbon black yield from the product is substantially increased.

The preferred solvent for treating the tar comprises a paraffinic hydrocarbon having from 5 to 9 carbon atoms.

The present invention will be more fully described by reference to the following description and accompanying drawings in which:

Figure 1 is a schematic illustration of apparatus adapted to the practice of one embodiment of the present invention;

Figure 2 is a schematic illustration of apparatus adapted to the practice of an alternative preferred embodiment of the invention;

Figure 3 is a graphical representation of the effect of a paraffinic solvent upon solids-free low temperature tar; and Figure 4 is a schematic illustration in cross-section of a typical carbon black furnace for liquid carbon black feedstock.

Referring to Figure 1, I have there illustrated one embodiment of the present invention for treatment of raw low temperature tar. Briefly, the illustrated process serves to remove finely divided solids consisting of coal and partially carbonized coal from raw low temperature tar. Raw low temperature tar 10 is introduced into a mixing vessel 11 along with about 0.75 to 3.0 parts of a paraffinic solvent 12. The tar and solvent are maintained under agitated conditions in the mixing vessel 11 at a temperature above the melting point of the tar, preferably in the range of 20 to 120° C. for raw tar. A solution is formed comprising the solvent and a major portion of the low temperature tar. A portion of the low temperature tar is insoluble in the solvent. The insoluble constituents of the tar coalesce with the finely divided particles of coal and partially carbonized coal which are maintained in agitation within the mixing vessel 11 and segregate from the solvent solution of soluble tar.

Solvents having from 5 to 9 carbon atoms will leave substantial quantities of undissolved tar as a tacky liquid phase in which the solvents are coalesced. A supernatant solution of such solvent and soluble tar is recoverable by simple decantation.

The solution and agglomerate particles are withdrawn from the mixing vessel 11 through a valved conduit 13 and introduced into a decanter 14. The tacky insoluble phase and solid particles are removed through a conduit 15. The solids-free supernatant phase of solvent and soluble tar is recovered through a conduit 16.

The solvent and tar solution is introduced from the conduit 16 into a distillation vessel 17 for separation of the solvent and substantially all of the tar constituents boiling below a final distillation temperature in the range 300 to 425° C. The solvent and distillate tar are recovered from an overhead conduit 18. The solvent may be reused in the process. The distillate tar fraction contains all of the valuable low boiling tar acids and neutral oils and also the intermediate boiling tar acids and neutral oils which are useful as creosote.

The high boiling residue is recovered as a distillation bottoms product through a conduit 19. The distillation residue comprises all of the solvent-soluble original low temperature tar constituents boiling above the distillation temperature in the range of 300 to 425° C. Preferably, the distillation vessel 17 is operated under vacuum to volatilize the low boiling constituents at relatively low temperatures. Thus thermal degradation of the high boiling residue is avoided.

The distillation residue recovered through the conduit 19 may be employed directly as a carbon black feedstock. High quality carbon black can be produced in high yield from this distillation residue.

Referring to Figure 2, a preferred embodiment of the present invention is illustrated wherein the tar is preliminarily freed of solids-free constituents boiling above a temperature between 300 and 425° C. Only the high boiling residue along with occluded solid particles is treated by solvent contact.

According to the process illustrated in Figure 2, the raw low temperature tar may be subjected to an initial flash vaporization to remove as a vapor product those tar constituents boiling below a final distillation temperature in the range 300 to 425° C. Thereby the finely divided solids consisting essentially of coal and partially devolatilized coal are concentrated in the high boiling tar residue from which they may be separated by a solvent treatment. Because of the preliminary removal of the low boiling constituents, only the high boiling residue requires the further solvent processing.

Raw low temperature carbonization tar 20 is introduced into a flash vaporization vessel 21 through a conduit 22. A continuous heater 23 preferably is provided to supply the heat requirements for the flash vaporization. The heater 23 preferably is of the pipe still variety employing highly turbulent flow to avoid coking of the tar components therein. The low boiling constituents of the tar are recovered as a solids-free distillate product through a conduit 24. The distillate contains substantially all of the tar constituents boiling below a final distillation temperature in the range 300 to 425° C.

The vaporization residue is recovered from the flash vaporization vessel 21 through a conduit 25. This residue includes substantially all of the tar constituents boiling above a final temperature in the range 300 to 425° C. in admixture with the finely divided particles of coal and partially carbonized coal which are present in the original low temperature tar. The vaporization residue is introduced into a mixing vessel 26 along with about 0.75 to 3.0 parts of a solvent 27. The contents of the mixing vessel 26 are maintained under agitation at a temperature above the melting point of the vaporization residue, preferably in the range of 50–150° C. A major portion of the liquid constituents of the vaporization residue are dissolved in the solvent.

The paraffinic hydrocarbon solvent having from 5 to 9 carbon atoms rejects an appreciable quantity of tar to form an insoluble tacky liquid phase in which the solids are coalesced.

The contents of the mixing vessel 26 are recovered through a valved conduit 28 and introduced into a decanter 29 for separation. The tacky insoluble phase and solid particles are withdrawn through a conduit 30. The solids-free supernatant phase of solvent and soluble tar is recovered through a conduit 31. The solvent is separated from the soluble high boiling tar in a solvent stripping vessel 32 and is recovered through a conduit 33 for reuse in the process. The high boiling, solids-free tar constituents are recovered through a conduit 34 for use as the carbon black feedstock of this invention. If desired, this material may be further treated to improve the quality of the resulting carbon black as will be hereinafter described in connection with Figures 3 and 4.

By employing the process of Figure 2, any thermal degradation of the tar resulting from distillation occurs prior to the solvent precipitation treatment. Thus thermal degradation products can be eliminated from the residue tar in the solvent precipitation treatment. Hence the process of Figure 2 is the preferred embodiment.

Where the liquid pyrolysis products are similar to low temperature carbonization tar, i.e., contain substantial quantities of occluded solid particles, the embodiments described in connection with Figures 1 and 2 will serve to eliminate the occluded solid particles as well as to prepare a premium carbon black feedstock. When the liquid pyrolysis products are solids-free materials, the processing is otherwise identical. However, the tacky, insoluble constituents recovered from the conduit 15 (Figure 1) or the conduit 30 (Figure 2) will then be solids-free hydrocarbonaceous liquids well suited as a feedstock for pitch coking processes. Where a solids-free tacky, insoluble phase is desired from a starting material containing occluded solid particles, pressure filtration may be employed to remove the solid particles prior to the processing herein described. The occluded particles usually are in such a fine state of subdivision that filtration (even pressure filtration) will accomplish the solid removal only at low throughput rates.

In either embodiment of this invention (Figure 1 or Figure 2) it may be preferable to conduct the solvent treatment in more than one stage. That is, the tar may be contacted with the solvent to recover a first soluble tar portion, which thereafter is recontacted with the solvent to improve the selectivity of the treatment.

Countercurrent contacting of the tar and solvent may provide a multi-stage solvent treatment on a continuous basis.

SOLVENT

The solvent of this invention may comprise paraffinic or naphthenic hydrocarbons boiling in the range of 80 to 300° C., i.e., well below the boiling range of the solids-free tar. In general, paraffinic hydrocarbons having from 5 to 9 carbon atoms are preferred. A heptane distillate fraction of paraffinic hydrocarbons is particularly preferred because of its relatively low cost, availability and effectiveness.

Paraffinic hydrocarbons having less than 5 carbon atoms do not dissolve sufficient tar constituents. Hence their yield of carbon black feedstock is low. Those paraffinic hydrocarbons having more than 9 carbon atoms will dissolve large quantities of the tar constituents and thus do not selectively eliminate the tar constituents which must be removed to produce a feedstock yielding premium quality carbon black.

The general effects of a paraffinic solvent on the liquid constituents of low temperature carbonization tar are illustrated in Figure 3. The block of Figure 3 represents a sample of low temperature carbonization tar. A vertical scale is provided to represent the weight percentage of the tar as distillate reading from top to bottom. A horizontal line A extends across the block representing a 300° C. distillate. A second horizontal line B extends across the block representing a 450° C. distillate. That portion of the block above the line A represents the tar distilling below 300° C., i.e., about one-fourth of the tar. That portion of the block between lines A and B represents the tar distilling between 300 and 450° C. That portion of the block below the line B represents the tar distilling above 450° C., i.e., nearly half of the tar.

Where the total tar (represented by the entire block) is contacted with heptane, that portion of the tar represented by the cross-hatched area is insoluble in the heptane. The unshaded portion of the block represents the tar which is soluble in the heptane.

For a particular carbon black feedstock having an initial distillation temperature represented by the wavy line C in Figure 3 (between 300 and 450° C.), the unshaded portion of the block below the line C represents the product of the processes of Figure 1 or 2 except for that quantity of tar rejected along with solid particles during processing. The line C is presented in a wavy form to indicate that residues obtained via flash vaporization do not achieve a precise distillation separation. The premium carbon black feedstock of this invention is represented generally by the unshaded portion of the block below the wavy line C in Figure 3.

The block representation concept employed in Figure 3 is a convenient means for illustrating the difference in effect between a solvent treating process and a distillation process. A horizontal line through a block designates a distillation, i.e., a separation of the material on the basis of boiling temperature without regard to the chemical characterization of the materials. Vertically extending lines, on the other hand, describe a separation of material on the basis of chemical characterization which occurs throughout the boiling range of the material.

CARBON BLACK FURNACES

The preparation of carbon black from the feedstock of the present invention follows the teachings of the carbon black furnace art. Figure 4 illustrates schematically in cross-section a typical furnace for preparing carbon black from liquid feedstocks. A refractory lined heated chamber 100 has a throat 101 at one end and a conveying conduit 102 at the other end. A conduit 103 is positioned in the throat 101 terminating in a nozzle 104. The liquid carbon black feedstock is introduced along with a supply of air into the conduit 103. The air to feedstock ratio is maintained so that some portion of the liquid feedstock is burned and the balance is pyrolyzed in the chamber 100 to produce carbon black. Secondary air and heating fuel are introduced into the heated chamber 100 through a conduit 105 at the throat 101 and/or through tangential openings 106 in the chamber 100. The secondary air and heating fuel maintain the chamber 100 at the desired feedstock pyrolysis temperature.

SUMMARY

I have found that a hydrocarbonaceous feedstock for preparing furnace carbon black in acceptable yield and quality can be prepared from liquid products of coal pyrolysis by recovering without vaporization thereof those materials which have not been exposed to temperatures above about 1400° F. and which (1) Boil above an initial distillation temperature between about 300 and 425° C. and
(2) Are soluble in a paraffinic solvent having from 5 to 9 carbon atoms.

The feedstock thus defined comprises from about 20 to about 60 percent of the total liquid products of coal pyrolysis.

*Example 1.*—Low temperature tar was obtained by fluidized low temperature carbonization of Arkwright coal at 925° F. Arkwright coal is a highly caking Pittsburgh Seam coal mined in northern West Virginia. The tar was freed of occluded solid particles of coal and partially devolatilized coal by pressure filtration. The solids-free whole tar had the properties listed in column A of Table II.

The solids-free tar was contacted with 2.2 volumes of hexane as a paraffinic solvent as described in connection with Figure 1. The hexane extract was distilled to remove materials boiling below 400° C. The properties of the hexane extract components boiling above 400° C. are set forth in column B of Table II.

The solids-free tar also was contacted at 100° C. with 2.1 volumes of pentane as a paraffinic solvent as described in connection with Figure 1. The pentane extract was distilled to remove materials boiling below 400° C. The properties of the pentane extract boiling above 400° C. are set forth in column C of Table II.

Table II.—*Analysis of whole tar (solids-free) and carbon black feedstocks prepared therefrom*

| Material | A<br>Whole tar | B<br>Hexane Extract | C<br>Pentane Extract |
|---|---|---|---|
| Initial boiling point, ° C | 160 | 400 | 400 |
| Benzene Insoluble | 6.44 | 0.15 | 0.0 |
| Ring and Ball, ° C | 108 | 83 | 73 |
| Conradson Carbon | 11.76 | 7.21 | 5.80 |
| Ultimate Analysis: | | | |
| H, wt. percent | 6.86 | 7.33 | 7.44 |
| C, wt. percent | 85.16 | 85.85 | 86.11 |
| N, wt. percent | 1.41 | 0.86 | 0.72 |
| O, wt. percent | 5.05 | 4.50 | 4.47 |
| S, wt. percent | 1.52 | 1.46 | 1.26 |
| H/C Ratio | 0.968 | 1.024 | 1.037 |
| Wt. Percent of Whole Tar | 100 | 47.1 | 40.2 |
| Wt. Percent Boiling Above 400° C | 62.8 | 100 | 100 |

The materials described in columns B and C of Table II are premium carbon black feedstocks. The yield and quality of carbon black obtained by processing these feedstocks in a carbon black furnace is comparable to those obtained from petroleum-derived liquid feedstocks. They are readily volatilizable. They represent a useful product which comprises about 40 percent and more of the total liquid components of the whole tar.

Note that the yield of carbon black feedstock is 40.2 percent when pentane is used as solvent and 47.1 percent when hexane is used as solvent. The yield of suitable feedstock generally increases as the number of carbon atoms in the solvent is increased. With solvents having more than about 9 carbon atoms, the extraction selectivity decreases.

Note further the increased H/C ratio of the materials in columns B and C of Table II. The H/C ratio of the hexane extract is 1.024; of the pentane extract is 1.037. The increase over the value of 0.968 for the whole tar represents an increase in volatility which is desirable in carbon black feedstocks. The sulfur, oxygen and nitrogen content of the product is desirably decreased from that of the starting material.

*Example 2.*—Low temperature tar was obtained by low temperature carbonization at about 900° F. in a rotary kiln of Pittsburgh Seam coal mined in southern Pennsylvania. The tar was processed generally as described in connection with Figure 2. The tar had the following analysis on a moisture-free basis:

Fraction: Wt. percent
  Solids ------------------------------------ 19.0
  Boiling below 160° C ---------------------- 3.2
  160–230° C -------------------------------- 12.1
  230–300° C -------------------------------- 7.7
  Boiling above 300° C ---------------------- 58.0

Tar components boiling below 300° C. were recovered by distillation whereby the solids were concentrated in the distillation residue. The solids-laden distillation residue was contacted at 245° F. with 1.75 volumes of heptane.

A solution comprising about 70 percent heptane and 30 percent soluble tar was recovered by decantation. This solution was distilled at 120° C. at atmospheric pressure to strip out most of the heptane solvent. The stripped tar, containing about 16–20 percent heptane, was contacted with about 1.35 volumes of heptane and the resulting solution of tar contained about 60–65 percent heptane and 35–40 percent soluble tar.

The properties of the soluble tar are tabulated in column B of the following Table III. The corresponding properties of the starting low temperature tar (including the components boiling below 300° C.) are tabulated in column A of Table III.

*Table III.—Properties of low temperature tar and of carbon black feedstock prepared therefrom*

| Material | A Whole Tar | B Carbon Black Feedstock |
|---|---|---|
| Specific Gravity [1] | 1.102 | 1.092 |
| H/C Ratio [1] | 1.07 | 1.045 |
| Solids Content, wt. percent | 19 | |
| Ultimate Analysis: [1] | | |
| H, wt. percent | 7.38 | 7.56 |
| C, wt. percent | 83.03 | 86.29 |
| N, wt. percent | 0.84 | 0.55 |
| O, wt. percent | 7.92 | 4.25 |
| S, wt. percent | 0.77 | 1.43 |
| Ash, wt. percent | 0.06 | 0.02 |

[1] Solids-free basis.

The carbon black feedstock described in column B of Table III was tested in a carbon black furnace similar to that illustrated in Figure 4. A typical acceptable carbon black feedstock was tested in the same furnace under identical operating conditions.

The yield of carbon black from the low temperature tar feedstock of this invention was 94.5 percent of that obtained from the petroleum-derived feedstock, based on pounds of carbon black per gallon of feedstock. The product carbon black showed the following values when tested by customary determinations.

*Table IV.—Carbon black analysis*

| | Product of Example 2 | Petroleum-Derived |
|---|---|---|
| Loose Black: | | |
| Oil absorption | 1.32 | 1.45 |
| Tint, percent | 90 | 94 |
| Iodine number | 79 | 76 |
| Photometer | 81 | 75 |
| Dried Pelletized Black: | | |
| Density | 23.6 | 22.5 |
| Packing number | 63 | 36 |
| −100 mesh fines | 2.1 | 4.6 |
| pH | 8.1 | 8.0 |

When compounded into rubber formulations, customary properties of the resulting rubber were determined. These results are tabulated in the following Table V for comparison with corresponding results obtained from petroleum-derived feedstocks.

*Table V.—Properties of rubber formulations with carbon black*

| | Petroleum-Derived | Product of Example 2 |
|---|---|---|
| Smoked Sheet Recipe: | | |
| Tensile, p.s.i. | 3,980 | 4,000 |
| Modules, p.s.i. | 3,440 | 3,280 |
| Crepe Rubber Recipe: | | |
| Tensile, p.s.i. | 3,900 | 3,910 |
| Modules, p.s.i. | 2,580 | 2,440 |
| Heat Build-up, ° F | 235 | 235 |
| GR-S Recipe: | | |
| Tensile, p.s.i. | 3,250 | 3,280 |
| Modules, p.s.i. | 2,200 | 2,030 |
| Extrusion, G./meter | 37.4 | 39.3 |
| Abrasion loss, g | 2.9 | 3.5 |

*Example 3.*—Low temperature carbonization tar was distilled to remove its components boiling below 230° C. and thereafter contacted with 0.7 volume of heptane to remove solids and insoluble tar. The soluble portion, after removal of the heptane solvent, was introduced into a carbon black furnace. The yield of carbon black was only 73 to 80 percent of that obtained from acceptable petroleum-derived feedstocks at the same furnace conditions. Essentially, the constituents boiling between 230 and 300° to 425° C. produced no carbon black.

Contrast this result with the fact that coke oven tar anthracene oils (boiling range from about 250 to 400° C.) are eminently suitable as carbon black feedstock.

DISPOSITION OF CO-PRODUCTS OF THE PROCESS

When a carbon black feedstock is produced from coal pyrolysis products according to this invention, various novel companion products are recovered. These co-products may be profitably utilized in an integrated refinery.

Referring to Figures 1 and 2, the low boiling solids-free tar recovered at 18 (Figure 1) and 24 (Figure 2) contains the valuable low boiling tar acids and neutral oils as well as middle boiling tar fractions useful as creosote. Each of these materials has a recognized commercial market.

The stream of occluded solids recovered at 15 (Figure 1) and 30 (Figure 2) comprises the solid particles originally in the raw low temperature carbonization tar coalesced in the insoluble tar. These streams comprise a tacky slurry of solids in tar which may be blended into road tars or may be sprayed onto coal prior to or during low temperature carbonization. The slurry may be pyrolyzed to yield a coke product and cracked tar vapors which can be condensed and reintroduced into the present process.

While all of the examples herein have been derived from products of bituminous coal, it is within the scope of this invention to include pyrolysis products from analogous naturally occurring hydrocarbonaceous materials such as sub-bituminous coal, lignite, peat, oil shale, tar sands and the like.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A hydrocarbonaceous carbon black feedstock derived from liquid products obtained by pyrolysis naturally occurring hydrocarbonaceous solids at a temperature between 800 and 1400° F., said products having been exposed only to temperatures below about 1400° F., comprising substantially all of the selective solvent-soluble solids-free hydrocarbonaceous liquid constituents thereof boiling above an initial boiling temperature in the range of 300 to 425° C., said selective solvent consisting essentially of paraffinic hydrocarbons having from 5 to 9 carbon atoms.

2. The method for preparing carbon black from coal which comprises pyrolyzing said coal at a temperature below 1400° F. to produce condensible liquid products, recovering from said liquid products at a temperature below about 1400° F. substantially all of the selective solvent-soluble constituents thereof which boil above an initial boiling temperature between 300 and 425° C., said selective solvent consisting essentially of paraffinic hydrocarbons having from 5 to 9 carbon atoms, introducing said constituents into a heated chamber as a spray along with a quantity of oxidizing gas sufficient to burn only a portion thereof and pyrolytically convert the remainder thereof to carbon black, and recovering carbon black from said heated chamber.

3. The method for preparing a carbon black feedstock from coal which comprises subjecting said coal to pyrolysis at a temperature below 1400° F. and recovering the liquid products of pyrolysis, and recovering as a carbon black feedstock from said liquid products at a temperature below about 1400° F. substantially all selective solvent-soluble constituents thereof which boil above an initial boiling temperature between 300 and 425° C., said selective solvent consisting essentially of paraffinic hydrocarbons having from 5 to 9 carbon atoms.

4. The method for preparing a carbon black feedstock from the liquid products obtained by pyrolysis of coal, said products having been exposed only to temperatures below about 1400° F., which comprises removing from said liquid products by distillation substantially all liquid constituents boiling below a temperature between 300 and 425° C., contacting the distillation residue with about 0.75 to 3.0 volumes of a solvent consisting essentially of paraffinic hydrocarbons having from 5 to 9 carbon atoms, recovering a solids-free solution of soluble liquids in said solvent, removing the solvent by distillation and recovering the distillation residue as a carbon black feedstock.

5. The method for preparing a carbon black feedstock from the liquid products obtained by pyrolysis of coal, said products having been exposed only to temperatures below about 1400° F., which comprises contacting said liquid products with about 0.75 to 3.0 volumes of a solvent consisting essentially of paraffinic hydrocarbons having from 5 to 9 carbon atoms, recovering a solids-free solution of soluble liquids in said solvent, removing by distillation said solvent and the liquid components boiling below a temperature between 300 and 425° C., and recovering the distillation residue as a carbon black feedstock.

6. The method according to claim 5 wherein said paraffinic hydrocarbons consist essentially of a heptane distillate fraction thereof.

7. A hydrocarbonaceous carbon black feedstock according to claim 1 wherein the liquid products are obtained by pyrolysis of coal.

8. A hydrocarbonaceous carbon black feedstock according to claim 1 which is derived from low-temperature coal carbonization tar.

9. The method according to claim 2 wherein said paraffinic hydrocarbons consist essentially of a heptane distillate fraction thereof.

10. The method for preparing carbon black which comprises pyrolyzing naturally occurring carbonaceous solids at a temperature between 800 and 1400° F. to produce condensible liquid products, recovering from said liquid products at a temperature below about 1400° F. substantially all of the selective solvent-soluble constituents thereof which boil above an initial boiling temperature between 300 and 425° C., said selective solvent consisting essentially of praffinic hydrocarbons having from 5 to 9 carbon atoms, introducing said constituents into a heated chamber as a spray along with a quantity of oxidizing gas sufficient to burn only a portion thereof and pyrolytically convert the remainder thereof to carbon black, and recovering carbon black from said heated chamber.

References Cited in the file of this patent

UNITED STATES PATENTS

| 1,438,032 | Frost | Dec. 5, 1922 |
| 2,631,982 | Donegan | Mar 17, 1953 |
| 2,774,716 | Kulik | Dec. 18, 1956 |

FOREIGN PATENTS

| 130,362 | Great Britain | Aug. 7, 1919 |
| 695,492 | Great Britain | Aug. 12, 1953 |

UNITED STATES PATENT OFFICE
CERTIFICATION OF CORRECTION

Patent No. 2,964,460 December 13, 1960

Martin B. Neuworth

It is hereby certified that error appears in the above numbered patent requiring correction and that the said Letters Patent should read as corrected below.

Column 11, lines 22 and 23, for "pyrolysis naturally" read -- pyrolysis of naturally --; column 12, line 42, for "praffinic" read -- paraffinic --.

Signed and sealed this 16th day of May 1961.

(SEAL)
Attest:

ERNEST W. SWIDER
Attesting Officer

DAVID L. LADD
Commissioner of Patents